United States Patent [19]

Mak

[11] Patent Number: 4,545,032

[45] Date of Patent: Oct. 1, 1985

[54] METHOD AND APPARATUS FOR CHARACTER CODE COMPRESSION AND EXPANSION

[75] Inventor: Stephen M. Mak, Pacific Palisades, Calif.

[73] Assignee: Iodata, Inc., Marina Del Rey, Calif.

[21] Appl. No.: 355,708

[22] Filed: Mar. 8, 1982

[51] Int. Cl.[4] .......................... G11B 13/00; G06F 5/00
[52] U.S. Cl. .................................... 364/900; 364/300; 340/347 DD
[58] Field of Search .............................. 340/347 DD; 364/200 MS File, 900 MS File, 300; 382/56

[56] References Cited

U.S. PATENT DOCUMENTS

| | | | |
|---|---|---|---|
| 3,432,811 | 3/1969 | Rinaldi et al. | 340/347 DD |
| 3,646,524 | 2/1972 | Clark, IV et al. | 364/300 |
| 3,662,347 | 5/1972 | Fox | 340/347 DD |
| 3,694,813 | 9/1972 | Loh et al. | 364/300 |
| 3,726,993 | 4/1973 | Lavallee | 340/347 DD |
| 3,976,844 | 8/1976 | Betz | 364/900 |
| 4,054,951 | 10/1977 | Jackson et al. | 364/900 |
| 4,064,489 | 12/1977 | Babb | 364/200 |
| 4,232,375 | 11/1980 | Paugstat et al. | 340/347 DD |
| 4,382,286 | 5/1983 | Mitchell et al. | 340/347 DD |

Primary Examiner—Eddie P. Chan
Assistant Examiner—Daniel K. Dorsey
Attorney, Agent, or Firm—Beehler, Pavitt, Siegemund, Jagger & Martella

[57] ABSTRACT

A method for compressing and expanding binary coded alphanumeric information is practiced in conjunction with a memory wherein user transparent, coded bytes are stored at address locations assigned to recognized permutations of the alphanumeric information. Information, stored in a plurality of input registers, is compressed by generating a memory address based upon the input information or using the input information directly as an address, and then determining from the memory whether or not the permutation represented by the information in the input registers is recognized. If recognized, a coded word is read from the memory which is representative of the permutation and is transmitted. Compression of the units of information per units of code used is achieved by reaccessing the memory with an indexed address generated from the contents stored in additional ones of the input registers or by addressing separate memory modules. Compressed information is expanded by generating addresses from the compressed code or using the compressed character directly as an address and then accessing a memory. If the compressed code represents a recognized permutation the address is indexed or separate memory modules addressed until the output indicates that no further expansion of the compressed code is recognized. The output generated on each memory access is the fully expanded code representing one of the constituent parts of compressed input code.

8 Claims, 5 Drawing Figures

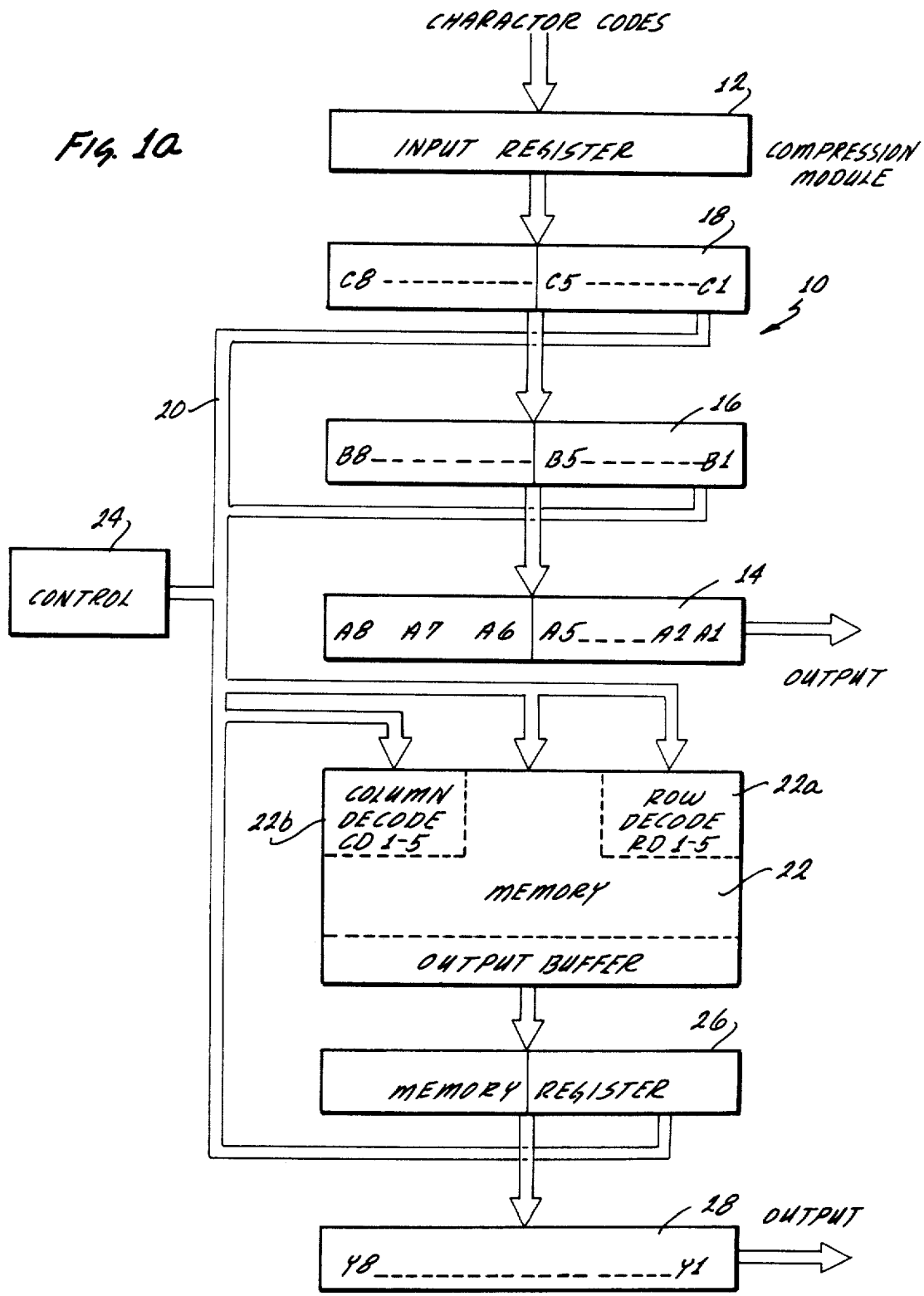

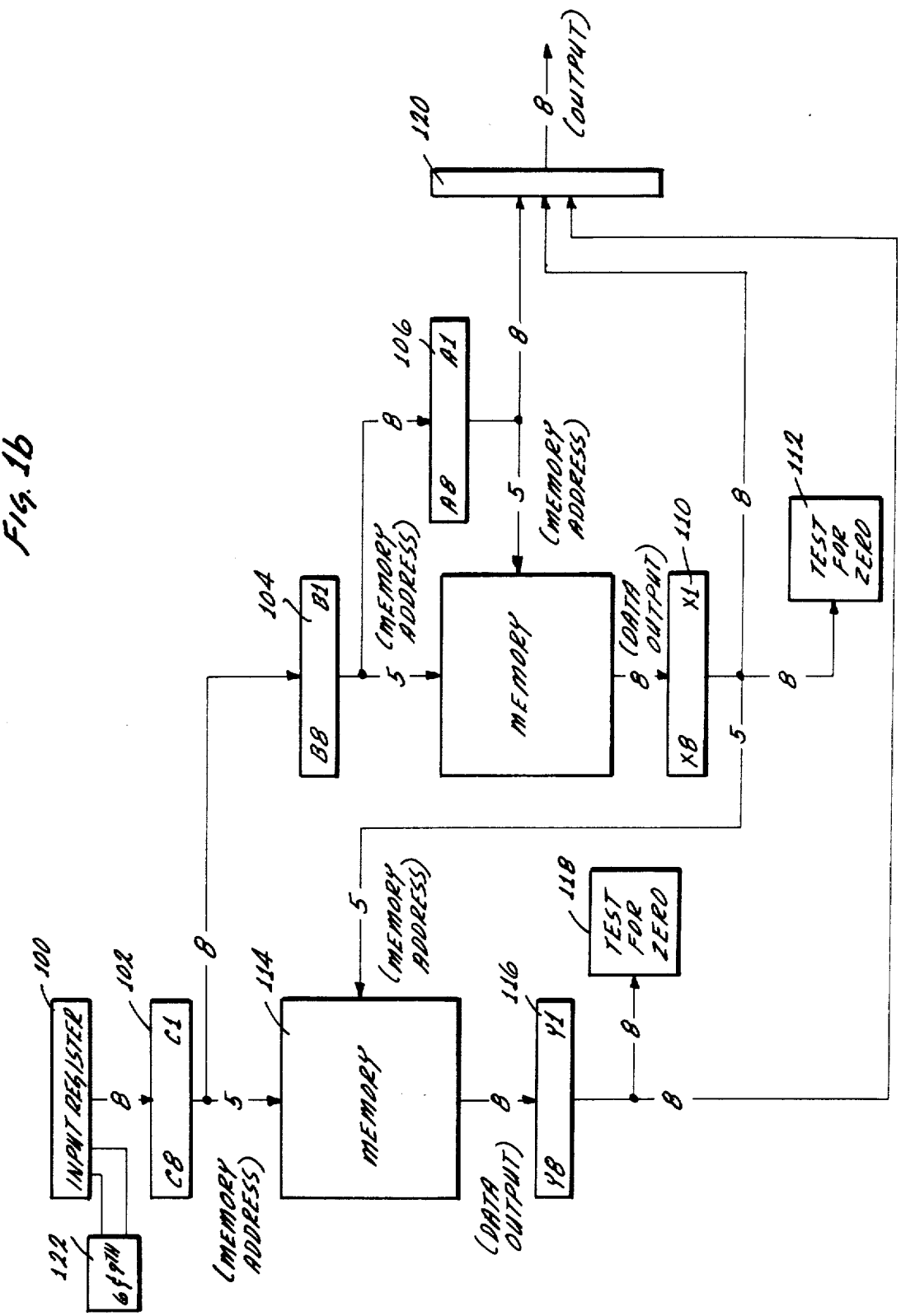

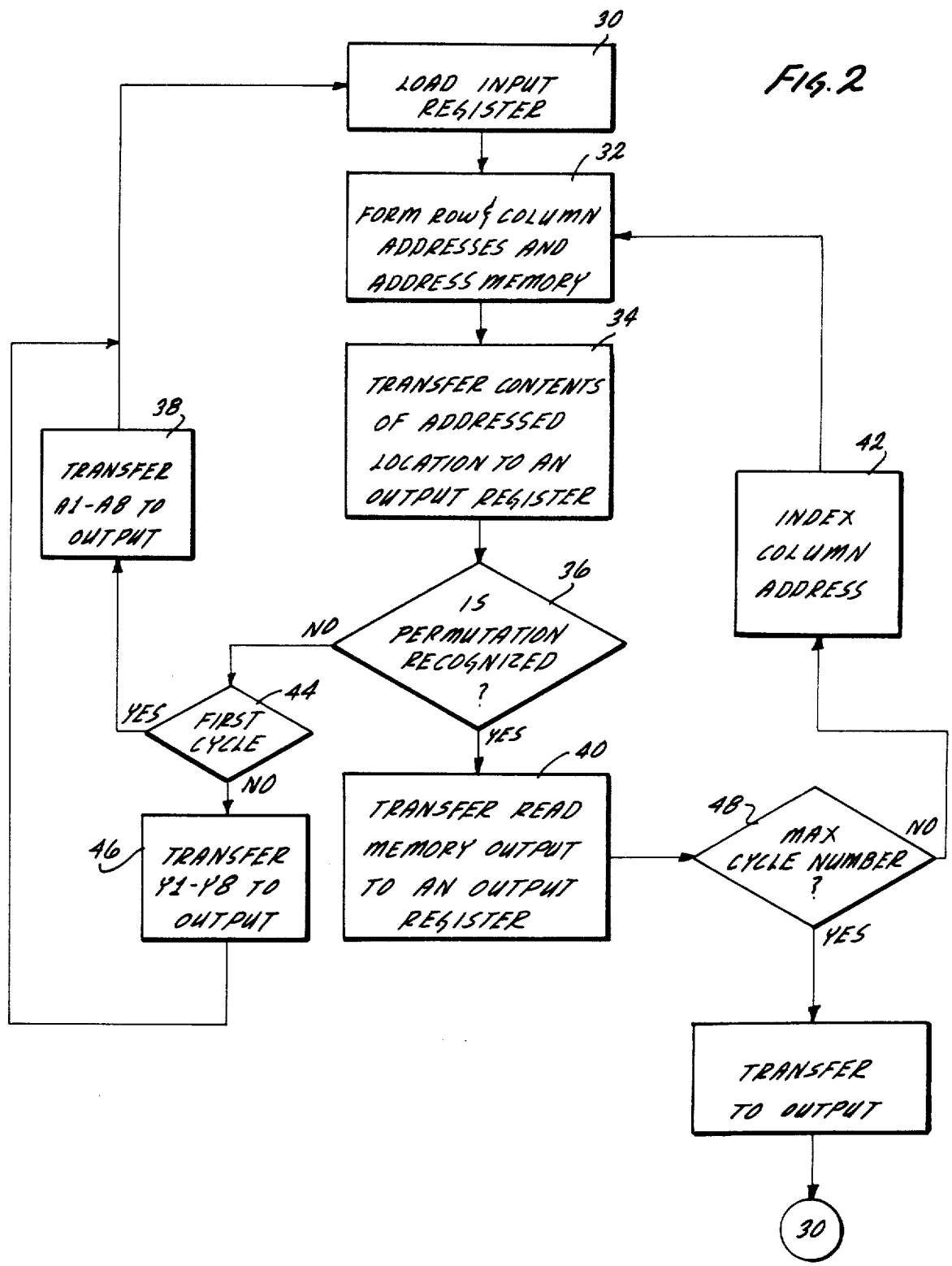

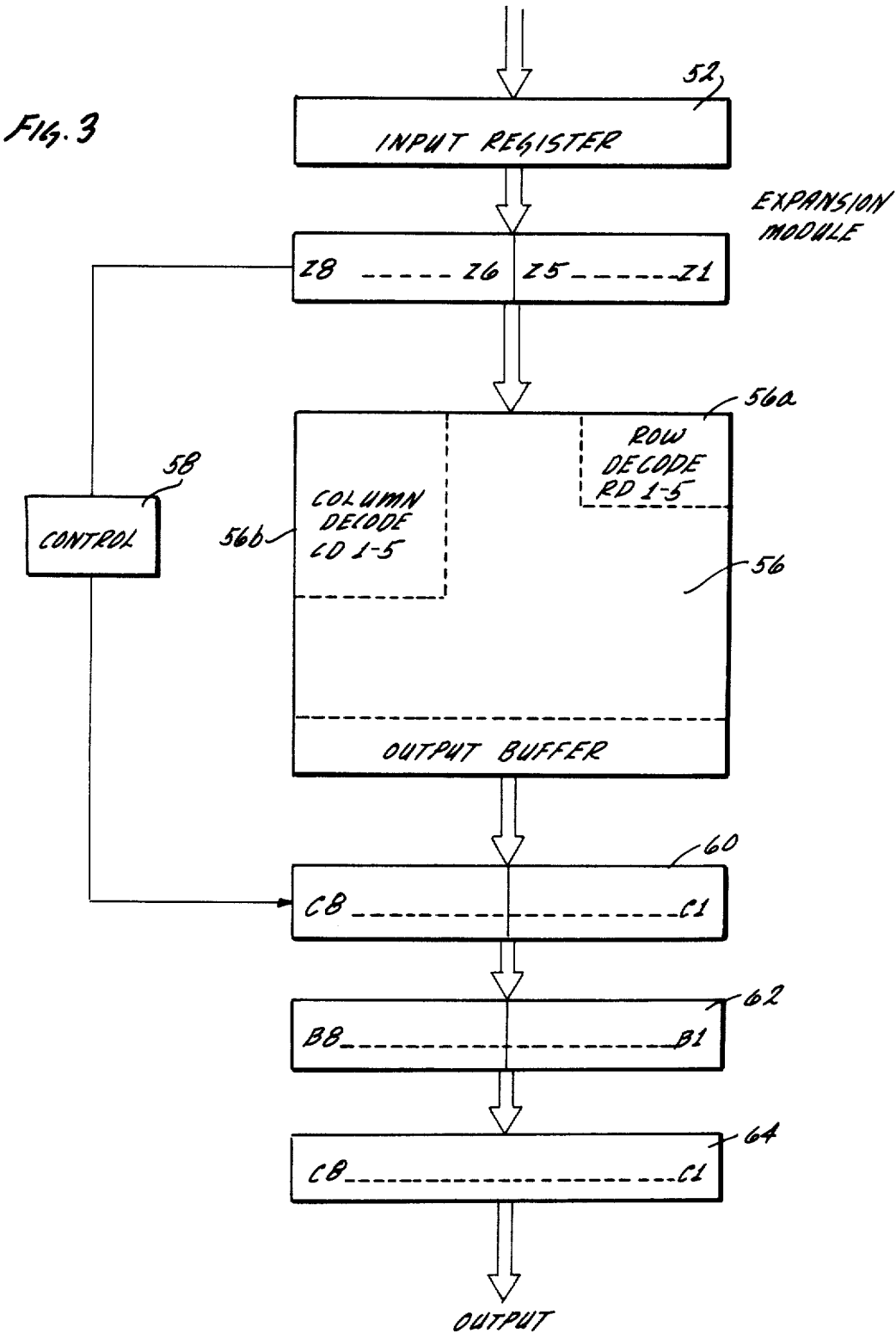

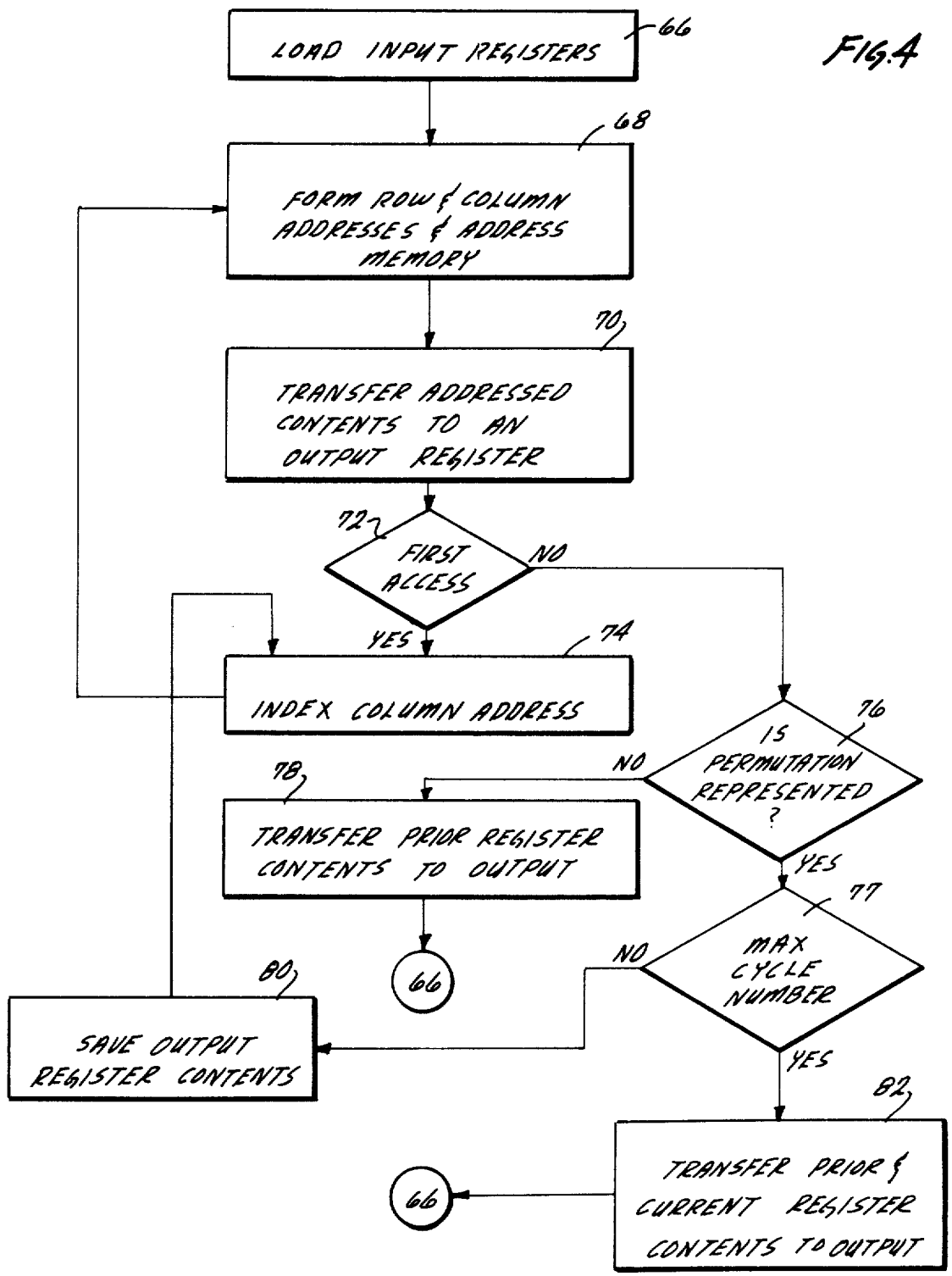

METHOD AND APPARATUS FOR CHARACTER CODE COMPRESSION AND EXPANSION

BACKGROUND OF THE INVENTION

1. Field of the Invention

The present invention relates to the field of computerized data compression and expansion, and more particularly relates to a methodology and apparatus for employing random access memories for character code compression and expansion.

2. Description of the Prior Art

Data or character code expansion and compression are widely used in the communications field to transmit or store information. One common class of methods and systems for data compression is that one which generates a mathematical combination describing the information to be transmitted and then transmits the result of the mathematical computation. The data is then expanded by a reverse mathematical computation. A second class of common data compression methods and apparatus is one in which redundant information is removed from the input data or characters. A code indicative of the amount of redundancy removed or compressed from the input codes is then transmitted along with the compressed data. A third class of data compression schemes is known which involves the addition of bits to the input data wherein the combined number represents a RAM or ROM address. The shorter or more compact address is then transmitted instead of the expanded contents which are contained at that memory address.

For example, Fox, U.S. Pat. No. 3,662,347 illustrates a compander system, namely a system that reduces the ampitude of high level signals and increases the ampitude of low level signals at the transmitter end with a reversal of the process at the receiver end. The system and method disclosed by Fox employs a read only memory that is used to expand and compress the data. An analog signal is coupled to comparator 4 in Figure 1a which is, in turn, coupled on a bit-by-bit basis to an output register 16 under the control of control register 15. Depending on the words stored in output register 16, a certain address is read from memory 8. The data stored in each location of memory 8 has a greater bit length than the data stored in output register 16. Therefore, the dynamic range of memory 8 can be greater than the stored number in output register 16. A number read from memory 8 is then reconverted into an analog signal and coupled to input 6 of comparator 4. The approximation repeats through successive cycles until each bit of the number stored in output register 16 has been set. When the number has been completely approximated it is then transmitted from output register 16. The graph of FIG. 2a in Fox shows the output and input relationships in curves 23 and 22. Curve 23 shows an expansion or enhancement of low level signals and a compression of the high level signals. What is transmitted are signals in the input range according to the mapping curves 22 or 23.

Rinaldi et al, U.S. Pat. No. 3,432,811, discloses a code convertor which accepts an eight bit word and converts it into a BCD value. The input is in pure binary form and is converted into a dual order binary coded decimal. The five bit output word consists of two orders, namely a four bit address and a fifth order bit. The binary input is converted into a first binary coded decimal output, which represents the four bit word. Since the binary input may range from 0 to 15, the output will correspond either to the decimals 0–9 or to 0–5 of a binary input in the range of 10–15. A 0 is put in the fifth order bit if the first four orders assume the decimal value of 0–9. A 1 is put into the fifth order bit if the four orders take on a value of 10–15.

Lavallee, U.S. Pat. No. 3,726,993 discloses a variety of methods of data compression wherein signals are encoded by utilizing a combination of OR gates which compresses a series of signals into a single bit. Information is encoded to remove all redundant bits. The compressed data, together with a code indicative of the state of compression, is accummulated in a memory for transmission. The information is expanded by reading the data backwards through a memory in the same order as it was encoded. Reading is controlled by the compression code. The information is progressively combined in Lavallee's apparatus in groups of combined signals and then those groups are further combined to form successfully smaller groups until a single group of combined signals is obtained.

Each of the prior art methods and apparatus for compressing and expanding information require the use of custom designed circuitry which implements a specific data compression method. As shown in Lavallee and in Rinaldi the circuitry can be quite complex. In each of the cases discussed above, the circuitry is restricted to implementing a single and very specific data compression and expansion methodology. In terms of hardware cost this complexity and this inflexibility results in a low function to cost ratio.

What is needed then is a method and apparatus which is simple in design thereby reducing the cost, increasing the reliability and minimizing on the space and complexity of electronics devoted to data compression and expansion. In addition, a methodology and apparatus is also needed which is inherently flexible and which allows for the possibility of varying the type or specie of data compression and expansion methodologies executable by a single circuit design. Further, what is needed is a methodology which can be implemented in circuitry which is of such general design that it may be time-shared or used in applications for purposes other than data compression and expansion.

These and other objects of the present invention can be better understood by considering the brief summary of the invention.

BRIEF SUMMARY OF THE INVENTION

The present invention is a method for data compression comprising the steps of storing a plurality of character codes indicative of character symbols in a corresponding plurality of registers. A memory is addressed with a first column address and a first row address. The column address is formed from a selected portion of a first one of the plurality of character codes which is stored in one of the registers. The row address is similarly formed from a selected portion of the second one of the plurality of character codes stored in another one of the registers. A first address location is read from the memory. The first addressed location contains a first compressed character code and is indicative of the permutation of the corresponding character symbols. By reason of this combination of steps a methodology is devised whereby character codes of groups of character symbols are generated to increase character symbol density per unit code utilized.

The method is further comprised of the steps of addressing the memory with a second column address and a second row address. The second row address is formed from a selected portion of a third one of the plurality of character codes stored in the plurality of registers and the second column address is formed from a selected portion of the compressed character code previously read from the memory. A second compressed character code is then read from the memory from a second location addressed by the second column and row addresses. The second compressed character code is indicative of a three character symbol permutation.

The method of the present invention includes the embodiment wherein the steps of addressing and reading are repeated for subsequent ones of the plurality of character codes. Subsequent row addresses are formed from a selected portion of the subsequent ones of the plurality of character codes stored within the input registers. Subsequent column addresses are formed from a selected portion of previous compressed character codes corresponding to previous ones of the plurality of character codes read from the memory. These subsequent character codes are indicative of the permutation of character symbols corresponding to all character codes thus far converted into memory addresses.

The present invention also includes a method for expansion of compressed character codes comprising the steps of storing an input character code which is possibly indicative of a permutation of character symbols in an input register. A first portion of a memory location is addressed with a first row address. The row address is formed from a first portion of the input character code which is stored in the input register. A first portion of a memory is addressed with a first row address and a first column address. The first column address is formed from a second portion of the input character code. A first location in the first portion of the memory is read into a first output register. A second portion of the memory is then addressed with the first row address and with a second column address. The second column address is formed from an indexed first column address. A second location in a second portion of the memory is read into a second output register. By virtue of this combination of steps, compressed data may be expanded. The contents of the second output register indicates whether the input character code is indicative of one character symbol or a permutation of a plurality of character symbols.

The method also comprises the further steps of testing the contents of the second output register to determine whether the second location read is indicative of more than one character symbol. The contents of the first register is transferred to an output if the second location read is indicative of a single character symbol.

The method may further comprise the steps of addressing a third portion of the memory with the row address and with a third column address. The third column address is formed from an indexed second column address. A third location is read from the third portion of the memory into a third output register. The contents of the third output register is tested to determine whether or not the contents of the third read location is indicative of more than two character symbols. If it is indicative of two character symbols the contents of the first and second registers are transferred to the output. If the third read location is indicative of three character symbols the contents of the first, second and third output registers are transferred to the output.

The steps of this method may be repeated through a plurality of cycles, namely the steps of addressing, reading, testing and transferring may be repeated a multiple cycles until the steps of testing indicates that the last read location is indicative of a single character symbol.

These embodiments and others, including a description of the apparatus for implementing the methodology of the present invention, can be better understood by viewing the following figures in light of the detailed description of the preferred embodiments.

BRIEF DESCRIPTION OF THE DRAWINGS

FIG. 1a is a simplified block diagram of the circuitry used by the present invention to implement the compression of character codes.

FIG. 1b is a simplified block diagram of another circuit embodiment which may be used to implement the compression of character codes.

FIG. 2 is a simplified flow diagram illustrating one methodology by which the apparatus of FIG. 1a may implement a character compression method.

FIG. 3 is a simplified block diagram showing the circuitry for implementing a character code expansion methodology of the present invention.

FIG. 4 is a simplified flow diagram illustrating the methodology which the circuitry of FIG. 3 may execute.

DETAILED DESCRIPTION OF THE PREFERRED EMBODIMENTS

Character codes wherein each code word is indicative of a single character symbol, typically an alphanumeric symbol, can be compressed and later expanded according to the present invention by using a look-up table to determine whether or not the permutation of character symbols is recognized or not. If the permutation of character symbols is recognized, a compressed character code will be read from the look-up table or memory. The process may continue on a character by character basis. For example, if a two character permutation is recognized, then the compressed character code indicative of the two character permutation is matched with a third character code to determine if that three character code permutation might be recognized. The process of permutation recognition and character code compression may continue until the capacity of the look-up table is exhausted.

Similarly, character code expansion is achieved by reversing the process. The character code is examined to determine whether or not it is a recognized compressed character code. A contingency exists that a character code which is received may be representative of a single character symbol. If the character code received is not recognized as a compressed character code, the input character code is assumed to be a single character symbol. If the input character code is recognized as a compressed character code, one of the constituent parts is read from the memory using the compressed character code as an address. The address is indexed so that different portions of the look-up table are read during successive cycles. The output of the look-up table is saved on each cycle and the address is repetitively indexed until the last location read from the table is indicative of a single character symbol. At this point, the information read from the look-up table comprises each of the constituent character codes indicative of corresponding single character symbols which constituted the recognized permutation of character symbols corresponding to the compressed character code.

The apparatus and methodology of the present invention is better understood by considering the following examples illustrated in connection with the drawings. FIG. 1a shows circuitry 10 for compressing the character codes. Compression circuitry 10 includes an input register 12 and three memory address registers, namely memory address registers 14, 16 and 18. In the preferred embodiment character codes are shifted in parallel from input register 12 through memory address registers 18, 16 and 14 in sequence. However, it is entirely within the scope of the present invention that character codes may be stored within registers 12-18 in any manner well known to the art and need not be sequentially shifted between them in the order indicated here. Registers 14-18 are coupled through an address bus 20 to a lookup table or memory 22 under the control of a control unit 24. The output of memory 22 is coupled to a memory register 26, which output is also coupled to the address bus 20. Memory register 26 is also coupled to output register 28.

In the following example the operation of the present methodology and the circuitry of FIG. 1a will be described in connection with eight bit bytes. In other words, the word length within each of the registers and memory shall be assumed to be eight bits, although it is entirely within the scope of the present invention that any word length may be used. Nine, ten, eleven or any number of bits may be used as the word length to expand the total number of recognized number permutations. In the case of a 16 bit word length the recognized permutations may in fact be essentially all English words, since more than a half million permutations could be recognized.

Referring now to FIG. 2, the methodology starts at step 30 wherein input registers 12-18 are loaded. Input register 12 may serve as an input buffer register wherein each input character code, indicative of a single character symbol, is loaded in register 12 either in serial or parallel format. Once loaded into register 12, the contents of register 12 is then transferred in parallel format to memory address register 18 and during subsequent clock cycles in step 30 to registers 16 and 14. Step 30 is completed when three, distinct input character codes are loaded into memory address registers 14-18. The row and column addresses for memory 22 are then formed in step 32.

In the illustrated embodiment the row address is formed from the first five bits of memory address register 14, namely bits, A1-A5. The column address is formed from the lowest order five bits of the contents of memory address register 16, namely bits B1-B5. A1-A5 and B1-B5 are coupled through address bus 20 under the control of control unit 24 to the column decode and row decode portions of memory 22. A1-A5 and B1-B5 may be the literal memory addresses of the first memory location accessed within memory 22 during step 32. A first location is accessed, and its contents read from memory 22 and ultimately coupled to memory register 26 in step 34.

The contents of register 26 is then tested under the control of unit 24 to determine whether or not the contents are indicative of a permitted or recognized permutation of character symbols. If not, this means that the contents of memory address register 14 cannot be combined into a compressed character code. Therefore, the contents of register 14 will then be transferred to the output at step 38. If this is the case, control unit 24 then accepts another input character code from input register 12 by recycling to step 30. The contents of register 16 and 18 are then shifted forward so that memory address registers 14-18 are again fully loaded. The method then continues with step 32 as described above.

If, when testing memory register 26 at step 36, the permutation of the character symbols corresponding to the contents of registers of 14 and 16 is recognized at step 36, memory 22 is again addressed with addresses formed at least in part from memory address register 18 and output register 26. The previously read memory output stored within register 26 is transferred to a second output register 28 at step 40. Before memory 22 is actually accessed, the column address is indexed at step 42. Indexing is accomplished in the illustrated embodiment by setting the highest order bit of a conventional, memory column decode 22b to 1. Memory 22 is then actually accessed by the indexed input to column decode 22b.

Once the second location within memory 22 is accessed, its contents is transferred to output register 26 in step 34. Again, the contents of register 26 is tested at step 36 to determine whether or not the contents of register 26 is a recognized permutation. If the contents is not a recognized permutation, it is then concluded that no further compression of the character code can be made. The previously read contents of memory 22, now stored within register 28, is then transferred to the output. The output is thus a compressed character code indicative of two character symbols.

Control unit 24 distinguishes between a first cycle indicating a nonrecognized permutation at step 44 wherein the contents of register 14 is transferred to the output and subsequent cycles wherein the contents of register 28 is transferred to the output.

If the contents of register 26 indicates that the twice compressed character code is a recognized permutation of character symbols then the contents of register 26 is transferred to register 28 in step 40 as before. If a maximum degree of character compression has been achieved as may be permitted by memory 22, the cycle is exited at step 48 and returns to the starting point 50. In the illustrated embodiment memory 22 has sufficient capacity to represent only compressed character codes indicative of three characters. However, it must be understood that in the present invention the cycle may be repeated an indefinite number of times, limited only by the capacity of memory 22.

A specific numerical example will be helpful in understanding the implementation of the present methodology. Table 1 illustrates a coding scheme which may be used in the present invention for compression of up to three character codes. Any coding scheme could be used, including any one of a number of binary coded schemes relating to the significance of the binary coding itself.

The coding scheme shown in Table 1 has an arbitrary format and is user independent. By being user independent it is meant that the coding scheme is specific only to the coding process itself or to the memories and is not dependant on or related in any manner to the nature of the user or to the nature of the user's system. In the present invention, the coding scheme is used to directly address the memories so that code conversion is unnecessary either during that phase of the operation which comprises data compression or in that phase which comprises data expansion. Thus, the code content is itself used as the address of the memory locations which are accessed. Similarly, the contents within each memory location serves as the address for a subsequently addressed memory location. Consequently, a compressed character code indicative of a multiplicity of symbols will directly address a memory location, whose contents will be a second memory location which will be used in turn to expand the character code, if possible, until single character codes have been read from memory. Although conversion may be required from the user's transmission coding format, no conversion is required whatsoever during the data compression and expansion method, thereby resulting in an extremely efficient and economical process which can be implemented in inexpensive circuitry. For example, a user's system may be based upon an ASCI code. In order to compress the data, the ASCI code is converted into a character coding scheme of the type shown in Table 1 which is subsequently used throughout the data compression process as disclosed. The recipient receives the character codes from the sender in the format set forth in Table 1. Data expansion is then practiced as disclosed herein thereby generating a plurality of character codes indicative of single character symbols. At that point, the character code, such as used in Table 1, can then be converted into standard ASCI format by the recipient user's system if necessary.

The permitted permutations of character codes are arbitrarily selected. For example, the double and triple character codes which are recognized in Table 1 can be chosen according to the frequency of their occurrence in a basic English vocabulary. The most frequent double and triple letter permutations are included within the recognized group. For example, consider the three letter permutation, "ize". Input registers 14-18 will be loaded in step 30 with three eight bit character codes corresponding to the single characters for "i", "z" and "e", namely: 0110 1001 for "i"; 0111 1010 for "z"; and 0110 0101 for "e".

During the first cycle the first five bits for "i" will form the column address, namely 01001. Similarly the first five bits for "z" forms the row address, 11010. This address pair defines a unique first location within memory 22 which is read at step 32. The contents of the first accessed memory location may include the number 1110 0100, which is indicated in Table 1 as being a recognized permutation. Recognition occurs at step 36 followed by transfer that number from register 26 to 28. Since only one memory read cycle has been executed, the maximum number of cycles has not been reached and a decision is made at step 48 to index the column address at step 42 and form a second pair of row and column addresses at step 32.

The column address is now formed from the lowest order five bits taken from memory register 26, namely from 00100. The new column address then becomes 10100 after the content of register 26 has been indexed in column decode buffer 22b by control unit 34. The new row address formed from the lowest five order bits from register 18, namely 00101 from the "e" character code. This second addressed location is then read from memory 22 and stored within register 26. Since the permutation for "ize" is recognized, the second memory location may contain the number 1110 0100 indicative again in Table 1 as "ize". Since the contents of memory register 26 are nonzero, they are shifted to register 28 and then transferred to the output. Thus, a compressed character code indicative of code "ize" is finally coupled to the output.

However, assume registers 14 and 16 contain the character codes for "i" and "n" instead of "i" and "z". The row and column addresses from registers 14 and 16 will access a first location whose contents may be 1010 0011 indicative in Table 1 of "in". Upon the next cycle the contents of register 18, containing "e", is used to access a second memory location which is not recognized in Table 1. The contents of that location shall be 0000 0000. When at step 36 the contents of memory register 26 is tested, the methodology preceeds through step 44 to step 46 to transfer the contents of register 28 corresponding to the recognized permutation "in" to the output. The combination for "ine" is not recognized in Table 1. Therefore, the cycle is returned to step 30 wherein input registers 14-18 are reloaded. In this example, the contents of register 18, indicative of "e" are shifted forward to register 14 with two new character codes being successively shifted into registers 16 and 18 to determine whether or not a double or triple character code is permitted beginning with the letter "e" and to such other characters as may correspond to the contents of registers 16 and 18.

Memory 22 is addressably organized as a 32×32 matrix. Thus, 1024 locations are provided wherein each location has a storage capacity for eight bits. During the first memory access the address is formed from the five lowest order bits of the input registers 14 and 16. Any one of thirty two rows and thirty two columns may be accessed within memory 22. The compressed code, if recognized is then read out. According to the illustrated methodology if the initial two character permutation is recognized, the column address has its highest bit set to one. Therefore, the second access of memory 22 will read only the right half of the memory, namely columns 16-31 and rows 0-31 which includes 512 memory locations. If the contents of the second read location are nonzero, the character code presented at the memory output will be a compressed character code indicative of a three character permutation. If the contents of the second read location is zero, then the first read location will be a character code indicative of a two character permutation. Therefore the addresses of all permitted three character combinations are in the right half of the memory. However, the contents of any address location need not equal the contents of the codes stored in the address location. According to the illustrated method, the address location of a two character compressed code is given by the five lowest order bits of the constitutient characters. The address location of a three character compressed code is given by a row address comprised of the five lowest order bits of the third constitutent character and a column address having a one in the fifth order bit position and the four lowest order bits the corresponding two character compressed code or a partially compressed three character compressed code. However, the contents corresponding to a two character or three character compressed code need not have any relationship to the address of that contents.

For example consider Table 1 again. According to the code assignments in Table 1, the address location of the two character compressed code for "es" must be 0 0101 for the row address and 1 0011 for the column address. The two character compressed code for "es" is recognized in Table 1 and is defined as 1001 1011. Assume that the third constitutent letter is "s". Therefore, during the second memory access the row address will be 1 0011. The column address will be 1 1011. The number stored at that location is also recognized as the three character compressed code for "ess", which in turn is defined in Table 1 as 1101 1010. However, you will note from examination of Table 1 that for any given five bits, there are eight associated characters or character permutations. However, single characters appear in only six columns of Table 1. Therefore, by inspection it could be determined from Table 1 that for any given permutation of five bits, three of the six columns are logically associated therewith. For example, for the letter "s" the bits 1 0011 are associated with "s", "S", and "3". Other possible associations involve multiple characters. These will not appear as part of the input character code since it is assumed that the input characters are associated only with single character symbols. Of the three possible associations in each case, two are alphabetic and one is numeric or at least nonalphabetic. Of the two alphabetic associations the distinction in each cases only between upper and lower case sizes of the same letter. To distinguish between an access to memory 22 from a "3" stored in an input register or an upper lower case "S" or flip-flops a flip-flop is included within control unit 24 and is coupled directly to the seventh bit, b7, of each input register 14–18. The code in Table 1 indicates that the nonalphabetic symbol, "3" for example, is distinguished by b7=1 while "S" and "s" have b7=0. In the illustrated embodiment only alphabetic permutations are recognized, therefore if the control flip-flop is set (b7=1), the register having b7=1 is treated as a noncompressible, single character symbol, e.g. "3". If b7=0, then it is assumed that the input character is alphabetic, e.g. "S" or "s". In the illustrated embodiment only lower case alphabetic permutations are recognized. Therefore, a similar upper/lower case flip-flop or flip-flops could be included in control unit 24 and directly coupled to the sixth bit of each input register, b6, which is zero when the alphabetic character is upper case and one when it is lower case. Again when the upper/lower case flip-flop is reset (b6=0), the corresponding input register will be treated as containing a noncompressible single character symbol. However, it must be understood that alternate coding and decoding schemes are included within the scope of the present invention which allow for the compression and expansion both alphanumeric and upper/lower case permutations. The scope of the invention should not be restricted to the embodiment herein illustrated which is described for clarity of undertaking.

FIG. 1b shows an alternative circuit to that of FIG. 1a for implementing compression of multiple character codes according to the present invention. A binary word corresponding to each input character is loaded into input register 100. On the first clock cycle, the word is transferred in parallel from register 100 to register 102. On subsequent clock cycles registers 104 and 106 are similarly loaded. After each of the registers 102, 104 and 106 have been loaded, a conventional memory 108 is accessed with the five lowest order bits from registers 104 and 106. The contents of register 104 serve as the column address and the contents of register 106 serve as the row address for the accessed location within memory 108. Memory 108 contains all recognized two character code permutations, including those two character codes permutations which may only be recognized according to the coding system of Table 1 as the first two characters of a three character code permutation. The contents of the accessed location within memory 108 are then coupled to memory output register 110. The contents of register 110 are tested by random logic circuitry 112 to determine whether or not the output is zero or non-zero. If the output is zero, the permutation represented by the contents of register 104 and 106 are not recognized according to the coding of Table 1. If the contents of register 110 are non-zero the permutation is recognized.

The five lowest order bits of the contents of register 110 are used, under the control of circuit 112, as the row memory address for memory 114. Similarly, the five lowest order bits of the contents of register 102 are used as the column address for memory 114. Memory 114 contains codes for all recognized three character code permutations. Again, the contents of the accessed location within memory 114 are transferred to an output register 116. The contents of register 116 are tested by logic circuit 118 to determine if they are zero or non-zero. If the contents are zero, it will be taken to mean that the three character code combination represented by the contents of registers 102, 104 and 106 is not recognized. At this point, the contents of register 110, assuming that it was non-zero, will be transferred under the control of circuit 118 to an output register 120. If the contents of register 116 is non-zero, this signifies that the three character code permutation corresponding to the contents of registers 102, 104 and 106 is recognized. In this case, the contents of register 116 will be transferred to output register 120 under the control of circuit 118. In the same manner, if the contents of register 110 were zero, the contents of register 106 would have been transferred to output register 120 under the control of circuit 112.

As before the contents of registers 102, 104 and 106 will be shifted among each other according to whether or not their permutations are recognized in memories 108 and 114. For example, if the output in register 110 indicated a non recognized two character permutation, as stated, the contents of register 106 will be transferred to output register 120. On the next clock cycle the contents of register 104 will be transferred to register 106, and the contents of register 102 transferred to register 104 with a new word being input to register 102 from the register 100. Thus, the cycle of examination for a permitted permutation will be repeated anew. Although registers 102, 104 and 106 have been shown as three separate registers with parallel shifting between them, it is entirely within the scope of the present invention that a serial shift register with parallel output could be equivalently used.

As in the case of the circuitry of FIG. 1a, input register 100 is coupled to logic circuitry 122 which, according to the illustrated coding scheme, will test bits 6 and 7 to distinguish alphabetic symbols from numeric symbols since alphanumeric permutations are not recognized in the illustrated embodiment, and if, appropriate, lower case alphabetic symbols from upper case symbols.

It must be understood that many discrete command lines and signals have been omitted from FIGS. 1a and 1b to clarify the schematic. For example, in FIG. 1b many discrete lines may be coupled between circuits 112, 118 and 122 and other illustrated circuit elements according to well understood design concepts in order to implement the described method in the illustrated circuitry.

The embodiment illustrated in FIG. 1b is distinguished from that illustrated in FIG. 1a in that separate memories are addressed rather than indexing an address in a single memory. The embodiment has been illustrated there for a three character code permutation, which limitation arises from the assumption in the illustrated embodiment that the processed word consists of eight bits. However, as stated above, the present invention can be used with a word length of any number of bits with equal ease. Thus, if a sixteen bit word length were used, the circuitry of FIG. 1b could be expanded to include a plurality of separate memories which could collectively recognize virtually all permutations of letters comprising words in the English language.

The extension of FIG. 1b can be achieved by coupling memories and registers to either memories 108 or 114 in the same manner as memories 114 and 108 are coupled together with their associated registers. For example, a third memory could be placed in FIG. 1b to the right of memory 108 which would use as its column address the contents of register 106. A fourth register would be coupled to register 106 in the same manner as register 106 is coupled to register 104 and would hold the row address for the additional memory. The additional memory would also have an output register which would be tested for zero content and be selectively coupled to output register 120. The additional input register would hold the row address for the additional memory. Thus, the chain of registers and memory can be indefinitely extended in theory by the addition of two registers, a test circuit and a memory for each additional character added to the maximum number of characters within a recognized permutation.

The circuitry for expanding the compressed character codes is shown in FIG. 3. Single character codes mixed with compressed character codes are transferred in serial or parallel format to input register 52. The contents of input register 52 are then transferred or shifted to memory address register 54. Register 54 in turn is selectively coupled by control circuit 58 to memory 56. Memory 56, as before, includes a column decode buffer 56b and a row decode buffer 56a as well as an output buffer. The output of memory 56 in turn is coupled to output memory registers 60, 62 and 64.

Consider now the operation of circuitry of FIG. 3 according to the methodology schematically illustrated in FIG. 4. Input character codes including compressed and noncompressed character codes are assembled in input register 52. Once assembled the input character code is transferred to register 54 in step 66. Row and column addresses are formed at step 68 and memory 56 is accessed. The lowest five order bits contained within register 54 are coupled under the control of control unit 58 to row decode buffer 56a. The highest three order bits, Z8-Z6, of register 54 are used to form the first three bits of the column decode address. The addressed contents are transferred from memory 56 to output register 60 at step 70. In the illustrated embodiment, step 70 also includes shifting the first output read from memory 56 from register 60 to register 62.

The fourth order bit of the column decode is then set to one at step 72 by control unit 58. Memory 56 is accessed a second time in the manner as before except the column address has been indexed as just described. The output of memory 56 is now transferred to register 60 and is tested to determine if the second read output is zero. If the second read output is zero, it indicates at step 76 that the contents of register 54 is indivative of a single character symbol and that a permutation is not represented by it. In this case the contents of output register 64 is transferred at step 78 to the output and a new input character loaded in register 54. In the illustrated embodiment, the character code indicative of a single character is transferred to register 64 and then to the output when the second accessed contents from memory 56 in register 60 is tested at step 76 and indicates that the character code in register 54 is not a recognized permutation. Alternatively output of a single character symbol could be made from input register 54 in this case.

In the event that testing of register 60 at step 76 indicates that the character code in register 54 is indicative of a permutation of characters the output register contents are saved at step 80 by shifting the contents of register 62 to register 64, and the contents of register 60 to 62. The column address is then indexed again at step 74, but this time by setting the fifth order bit of the column decode to one rather than the fourth order bit. A row and column address is formed as before in step 68 and the memory read. The output of the memory is transferred to register 60 in step 70 and again tested at step 76. If the contents of register 60 is zero, this means that the contents of output registers 62 and 64 are each indicative of a single character symbol and are thus transferred to the output at step 78. If the contents of register 60 are non-zero this indicates that the number stored within register 54 is indicative of a compressed character code of more than two characters. In the illustrated embodiment, memory 56 has been designed to recognize only compressions up to three characters. Therefore, the number of cycles is tested at step 77 and if three memory accesses have been made, it is concluded that the contents of register 60 at this point is also indicative of a single character symbol and the contents of registers 60, 62 and 64 are transferred to the output at step 82.

Consider now an example of code expansion. Assume the code for "ize" from Table 1 is loaded into register 54, namely, 1110 0100. The row address will be 0 0100 and the column address 0 0111 for the first access of memory 56. Stored at that location will be the code for "i", namely 0110 1001. This will be transferred from register 60 to 62. Memory 56 will be addressed a second time using the row address 0 0100 and column address 01111. The output will be the character code for "z", namely 0111 1001. Since the contents of register 60 are nonzero, memory 56 will be accessed again. Once again the row address will be 00100 and the column address will be indexed to 1 1111. The numbers stored at this designated location will be that corresponding to the symbol "e", namely 0110 0101. Since the contents of register 60 at the end of the third memory access is still nonzero, this will be interpreted by control unit 58 as indicative of a single character symbol. Therefore, the contents of registers 60, 62 and 64 will be transferred to the output. The output which will be transferred will be three character codes which were the constitutents of the compressed character code initially loaded in register 54.

It must be understood that many modifications and alterations may be made to the illustrated embodiment by those having ordinary skill in the art without departing from the spirit and scope of the present invention. The embodiment described above has been presented only for the purposes of illustration and clarification and is not meant to limit the scope of the invention as set forth in the following claims.

CODE TABLE

| b4 | b3 | b2 | b1 | b→8<br>b→7<br>b→6<br>b→5 | 0<br>0<br>0<br>0<br>0 | 0<br>0<br>0<br>1<br>1 | 0<br>0<br>1<br>0<br>2 | 0<br>0<br>1<br>1<br>3 | 0<br>1<br>0<br>0<br>4 | 0<br>1<br>0<br>1<br>5 | 0<br>1<br>1<br>0<br>6 | 0<br>1<br>1<br>1<br>7 | 1<br>0<br>0<br>0<br>8 | 1<br>0<br>0<br>1<br>9 | 1<br>0<br>1<br>0<br>A | 1<br>0<br>1<br>1<br>B | 1<br>1<br>0<br>0<br>C | 1<br>1<br>0<br>1<br>D | 1<br>1<br>1<br>0<br>E | 1<br>1<br>1<br>1<br>F |
|---|---|---|---|---|---|---|---|---|---|---|---|---|---|---|---|---|---|---|---|---|
| 0 | 0 | 0 | 0 | 0 |     | can | SP | 0 | @ | P | cal | p | ad | ca | fi | me | so | ve | men | SOR |
| 0 | 0 | 0 | 1 | 1 | sub | DC1 | om | 1 | A | Q | a | q | al | ci | fy | no | sw | we | had | the |
| 0 | 0 | 1 | 0 | 2 | com | con | "  | 2 | B | R | b | r | am | co | he | ny | sc | wh | ics | tle |
| 0 | 0 | 1 | 1 | 3 | and | DC3 | #  | 3 | C | S | c | s | an | ck | in | of | sh | ze | mg | til |
| 0 | 1 | 0 | 0 | 4 | EOT | cle | $  | 4 | D | T | d | t | as | cl | im | on | sp | age | ize | was |
| 0 | 1 | 0 | 1 | 5 | ENQ | ate | %  | 5 | E | U | e | u | at | de | ir | or | st | ary | ory | ure |
| 0 | 1 | 1 | 0 | 6 | ist | dis | ∅  | 6 | F | V | f | v | ba | di | is | os | la | are | ism | tal |
| 0 | 1 | 1 | 1 | 7 | BEL | ber | '  | 7 | G | W | g | w | be | do | it | ow | ta | ous | ity | ite |
| 1 | 0 | 0 | 0 | 8 | pro | pre | ph | 8 | H | X | h | x | bi | da | ie | pr | th | ble | tor | ude |
| 1 | 0 | 0 | 1 | 9 | ple | wi  | ro | 9 | I | Y | i | y | br | er | if | pl | to | but | ial | ar |
| 1 | 0 | 1 | 0 | A | LF  | bly | *  | : | J | Z | j | z | bl | lo | la | qw | tr | ess | ice | cs |
| 1 | 0 | 1 | 1 | B | (VT)| ESC | +  | ! | K | sm| k | est | by | es | le | ra | ty | ful | ian | ge |
| 1 | 1 | 0 | 0 | C | FF  | mi  | .  | ry| L | ha| l | ent | ce | en | li | re | un | for | mis | hy |
| 1 | 1 | 0 | 1 | D | CR  | my  | —  | = | M | th| m | bu | ch | ex | lo | sa | np | ght | phy | ic |
| 1 | 1 | 1 | 0 | E | SO  | ser | .  | te| N | wa| n | bo | cr | fa | ly | se | ns | gle | per | ia |
| 1 | 1 | 1 | 1 | F | SI  | may | /  | , | O | ha| o | DEL | cy | fe | ma | si | nc | has | ter | il |

I claim:

1. A method for data compression comprising the steps of:

storing a plurality of character codes of fixed bit length indicative of character symbols in a corresponding plurality of registers, said character codes having an arbitrary format and being user transparent in that said character codes are specific to a memory and independent of a user of said memory;

directly addressing a memory with a first column address and first row address, said column address being at least a bit segment of a first one of said character codes stored in one of said plurality of registers, and said row address being at least a portion of a second one of said character codes stored in another one of said registers; and reading a first compressed character code of fixed bit length from a first address location within said memory corresponding to the permutation of said first and second ones of said plurality of character codes and indicative of the permutation of the corresponding character symbols;

addressing said memory with a second column address and a second row address, said second row address being at least a bit segment of a third one of said character codes, said second column address being at least a bit segment of said compressed character code just read; and reading a second compressed character code of fixed bit length from a second location in said memory addressed by said second column and row address, said compressed character code indicative of a three character symbol permutation, said second column address being indexed to address a distinct portion of said memory, whereby character codes representative of groups of character symbols are generated to compress character symbol density per unit code.

2. A method for expansion of compressed character codes comprising the steps of:

storing an input character code of fixed bit length contingently indicative of a permutation of character symbols in a register, said character codes having an arbitrary format and being user independent in that said character code is specific to a memory and independent of a user of said memory;

directly addressing a first section of a memory with a first row address, said first row address being at least a portion of said input character code stored in said register and directly addressing said first portion of said memory with a first column address, said first column address being a second bit segment of said input character code;

reading from a first location of fixed bit length in said first section of said memory into a first output register;

directly addressing a second section of said memory with said first row address and with a second column address, said second column address being in part at least a second bit segment of said input character code, said first and second column addresses being distinct; and reading from a second location of fixed bit length in said second section of said memory into a second output register;

whereby compressed data may be expanded, and whereby the contents of said second output register is indicative of whether said input character code corresponds to a permutation of a plurality of character symbols.

3. The method of claim 2 further comprising the steps of:

testing the contents of said second output register to determine whether said second read location is indicative of more than one character symbol; and transferring the contents of said first register to an output if said second read location is indicative of a single character symbol.

4. The method of claim 3 further comprising the steps of:

directly addressing a third section of said memory with said row address and with a third column address, said third column address being at least a portion of said second bit segment of said input character code and being distinct from said first and second column addresses; and reading from a third location of fixed bit length in said third section of said nemory into a third output register.

5. The method of claim 4 further comprising the steps of:

testing the contents of said third output register to determine whether the contents of said third read location is indicative of more than two character symbols; and transferring the contents of said first and second registers to said output if said input character code is indicative of two character symbols.

6. The method of claim 5 further comprising the step of transferring the contents of said first, second and third output registers to said output if said third read location is indicative of three character symbols.

7. The method of claim 2 wherein the steps of directly addressing, reading, testing and transferring are repeated a multiple of cycles until the step of testing indicates said last read location is indicative of a single character symbol.

8. The method of claim 7 wherein the step of reading each cycle reads from a distinct section of said memory.

* * * * *